(No Model.)
W. R. SPRAY.
WAGON TONGUE SUPPORT.
No. 314,074. Patented Mar. 17, 1885.
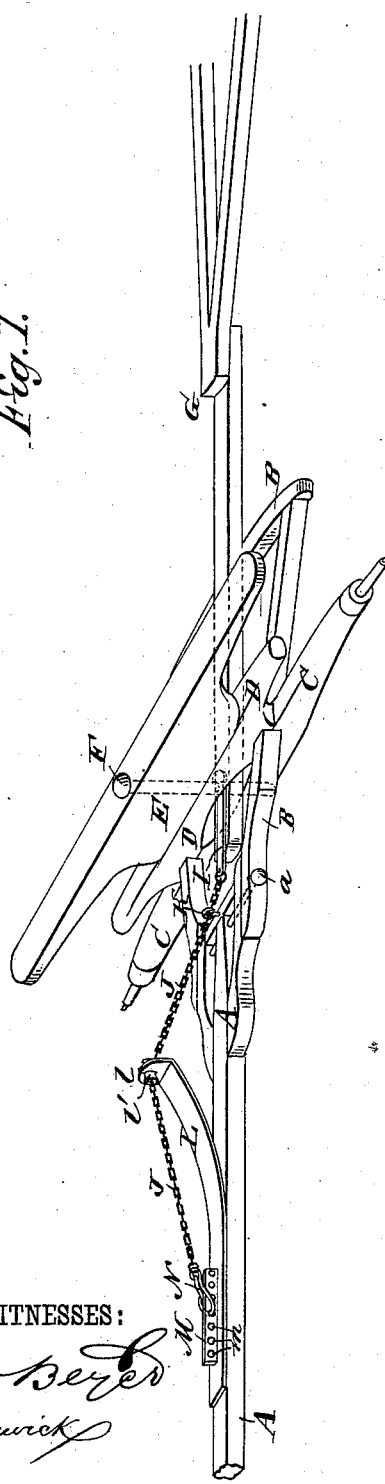
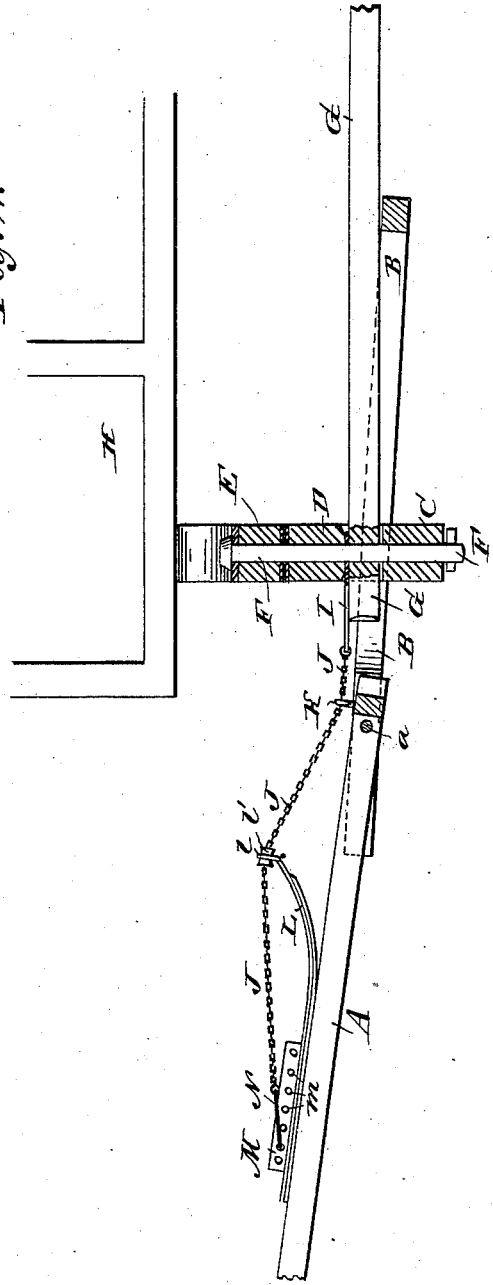
WITNESSES:
Otto Beyer
C. Sedgwick
INVENTOR:
W. R. Spray
BY
ATTORNEYS.

United States Patent Office.

WILLIAM ROYALTY SPRAY, OF INGRAHAM, ILLINOIS.

WAGON-TONGUE SUPPORT.

SPECIFICATION forming part of Letters Patent No. 314,074, dated March 17, 1885.

Application filed November 12, 1884. (No model.)

*To all whom it may concern:*

Be it known that I, WILLIAM ROYALTY SPRAY, of Ingraham, in the county of Clay and State of Illinois, have invented a new and Improved Wagon-Tongue Support, of which the following is a full, clear, and exact description.

The object of my invention is to provide a simple, inexpensive, and efficient wagon-tongue support, whereby the tongue may be held at any desired height at its outer end to accommodate animals of different heights, and will be supported yieldingly, so as to lessen the effect of the shocks of the running-gear on the tongue and avoid excessive noises and wear of the harness.

The invention consists in a wagon-tongue support constructed with a chain or cord held to the forward running-gear on the wagon and passing over a spring held to the tongue to a flange or plate having a series of holes and fixed to the tongue in front of the spring.

The invention consists, also, in particular constructions and combinations of parts of the tongue-support, all as hereinafter fully described and claimed.

Reference is to be had to the accompanying drawings, forming part of this specification, in which similar letters of reference indicate corresponding parts in both the figures.

Figure 1 is a perspective view of the forward part of the running-gear of a wagon with my improvement applied to support the tongue, and Fig. 2 is a sectional side elevation of the same.

The letter A indicates the wagon-tongue, which is pivoted at *a* to the hounds B, which are secured between the axle C and axle-block D, on which block the bolster E is held so as to turn freely by the king-bolt F, which passes through the head-block, axle-block, and axle, and through the forward end of the reach G, which passes through the opening made for it between the axle and axle-block.

All the above-named parts, together with the box or body H of the vehicle, may have any approved construction and arrangement, as they form no part of my invention.

The letter I indicates a link, preferably a plate of steel, the back end of which is inserted between the axle-block D and reach G, and has a hole through which the king-bolt F passes; and to the outer end of the link I is attached a chain, J, or it may be a cord, wire, or rope, and said chain passes forward through an eye or hook, K, fixed to the back end of the tongue, and thence to and through the upturned rear end, *l*, of a leaf or plate spring, L, which is fixed at its forward end to the tongue A, and has fixed to it a flange or rib, M, having a series of holes, *m*, into any one of which a snap-hook, N, or other suitable attaching device, fixed to the forward end of the chain J, may be passed.

It will be seen that when the hook N is placed in one of the holes *m* at or near the center of the flange M the wagon-tongue will be supported yieldingly by the king-bolt F, link I, chain J, and spring L, about in horizontal plane, as in Fig. 1, and when the hook N is placed in one of the forward holes *m* the tongue will be held with its outer end raised more or less to suit animals of different heights, and will hold the tongue in the best position for the proper action of the harness, and keep the weight of the tongue off of the animals and their harness.

The elasticity of the spring L prevents in a large degree the imparting of the quick vertical jolting movements of the forward running-gear to the outer end of the tongue, thereby lessening the shaking of the harness and avoiding many disagreeable noises incident to traveling over rough roads, and promoting the durability of the harness.

When the hook N is placed in one of the rear holes *m*, the tongue will be allowed to rest on the ground, and without putting the spring L in tension, as is desirable when the vehicle is out of use, and the tongue may freely be swung upward to the front of the wagon-box without in any way adjusting the tongue-support.

The eye or hook K is not essential to the successful operation of the tongue-support, as the chain J may draw directly from the end of the link I; but by passing the chain through the eye K, which is positioned back of the pivot *a* of the tongue, (see Fig. 2,) a more sensitive balance of the tongue by the spring and chain is obtained.

The spring L may consist of a single leaf or plate, as in Fig. 1, or of two leaves or plates, as in Fig. 2; and I do not limit myself to the use of a plate-spring, as other forms of springs—a spiral spring, for instance, with suitable vertical guides and supports—may be employed; but the plate-springs are preferred, as they are not so liable to injury, and are cheaper to make and put in place.

I prefer to flange the edge of the hole in the end of the spring L through which the chain J passes, or to fix to the spring a short piece of tubing, as at l', so that the chain may move freely through the end of the spring and without catching on it, as will readily be understood.

The drawings represent the forward end of the tongue broken off or removed in order to show the tongue-support to better advantage.

Having thus described my invention, I claim as new and desire to secure by Letters Patent—

1. A wagon-tongue support constructed with a chain or cord held to the wagon running-gear and passing over a spring held to the tongue and secured to a plate fixed to the tongue in front of the spring, substantially as herein set forth.

2. The combination, in a wagon-tongue support, of the link I, held to the king-bolt F, the chain J, spring L, and plate M, having a series of holes, m, and secured to the tongue, substantially as herein set forth.

3. The combination, in a wagon-tongue support, of the link I, held to the king-bolt F, the chain J, eye or hook K, spring L, and flange M, having a series of holes, m, substantially as herein set forth.

4. The combination, in a wagon-tongue support, of the link I, held to the king-bolt F, the chain J, eye or hook K, spring L, flange M, having a series of holes, m, and a snap-hook, N, on the chain J, substantially as herein set forth.

WILLIAM ROYALTY SPRAY.

Witnesses:
JOSEPH McKNIGHT,
JOSHUA B. CRAIG.